United States Patent [19]
Cho

[11] Patent Number: 5,687,043
[45] Date of Patent: Nov. 11, 1997

[54] HEAD DRUM ASSEMBLY FOR USE IN A VIDEO CASSETTE RECORDER

[75] Inventor: Bu-Hyun Cho, Seoul, Rep. of Korea

[73] Assignee: Daewoo Electronics, Co., Ltd., Seoul, Rep. of Korea

[21] Appl. No.: 637,837

[22] Filed: Apr. 25, 1996

[30] Foreign Application Priority Data

Apr. 29, 1995 [KR] Rep. of Korea ............... 95-10600

[51] Int. Cl.[6] ................... G11B 5/52; G11B 21/04; G11B 21/18
[52] U.S. Cl. ........................... 360/107; 360/108
[58] Field of Search .................. 360/84, 85, 107, 360/108

[56] References Cited

U.S. PATENT DOCUMENTS

| | | | |
|---|---|---|---|
| 4,117,519 | 9/1978 | Shioyama et al. | 360/84 |
| 4,400,751 | 8/1983 | Tominaga | 360/107 |
| 4,964,006 | 10/1990 | Ota | 360/108 |
| 5,113,298 | 5/1992 | Fukushima et al. | 360/108 |
| 5,388,018 | 2/1995 | Falk | 360/107 |

Primary Examiner—Robert S. Tupper
Assistant Examiner—William J. Klimowicz
Attorney, Agent, or Firm—Pennie & Edmonds, LLP

[57] ABSTRACT

A head drum assembly for use in a video cassette recorder includes a stationary shaft, a rotary drum, a stationary drum, a ring collar, a rotor transformer, a stator transformer, and a conical washer spring. The rotor transformer and the stator transformer are attached to the rotary drum, and to a bottom surface of a stator transformer attachment plate fitted around the ring collar. The conical washer spring is fitted around the stationary shaft and interposed between the rotary drum and the ring collar. A correct separation between the rotor transformer and the stator transformer is obtained by adjusting a vertical position of the ring collar until the stator and rotor transformers have a predetermined separation, then immobilizing the ring collar by tightening a locking screw provided therein. This allows a simpler manufacturing process and lowers the defects rate, ultimately resulting in a lower unit cost.

5 Claims, 3 Drawing Sheets ic # HEAD DRUM ASSEMBLY FOR USE IN A VIDEO CASSETTE RECORDER

FIELD OF THE INVENTION

The present invention relates to a head drum assembly for use in a video cassette recorder ("VCR"); and, more particularly, to a head drum assembly with a modified structure which facilitates the manufacturing process thereof.

DESCRIPTION OF THE PRIOR ART

Referring to FIG. 1, is there is shown a conventional ball bearing type head drum assembly for use in a VCR. The head drum assembly comprises: a rotating shaft 1 divided into an upper part 1a, a middle part 1b, and a motor attachment part 1c; a flange 3 fitted tightly around the upper part 1a of the rotating shaft 1; a rotary drum 2 fitted around the flange 3; a stationary drum 4 fitted around an upper and a lower ball bearing assemblies A1, A2 arranged around the middle part 1b of the rotating shaft 1; a ring collar 5 fitted tightly around the motor attachment part 1c; and a motor assembly casing 6 bolted to the ring collar 5 by means of a plurality of screws 6S.

In the above head drum assembly, the rotary drum 2 fits around the flange 3 and is bolted to it by means of a screw 3S. Thus, both the rotary drum 2 and the flange 3 are immobilized in relation to the rotating shaft 1, and must rotate with the rotating shaft 1. In addition, the rotary drum 2 is also provided with a plurality, e.g., a pair, of magnetic heads 2a on its bottom surface (not shown). The magnetic heads 2a are attached to the rotary drum 2 by means of the same number of screws 2S as that of the magnetic heads 2a.

The flange 3 is provided with a protruding annular portion (not shown) on a circumferential part of its bottom surface (not shown). In addition, a first axial protrusion 3P is also prepared on an axial part of the bottom surface of the flange 3. The axial protrusion 3P contacts and constrains the upper ball bearing assembly A1 from moving upwards.

A second axial protrusion 5P is provided on an axial part of a top surface of the ring collar 5. The second axial protrusion 5P contacts and constrains the lower ball bearing assembly A2 from moving downwardly. Thus, the first axial protrusion 3P and the second axial protrusion 5P keep the bearing assemblies A1, A2, and the stationary drum 4 fitted around them from moving up or down in relation to the rotating shaft 1.

The stationary drum 4 is provided with a circular stator transformer groove (not shown) on its top surface, and a motor stator attachment part (not shown) on its bottom surface. In addition, the stationary drum 4 is also provided with a horizontal printed circuit board ("PCB") slot (not shown) on its circumferential surface. The stationary drum 4 is fitted around the upper and the lower ball bearing assemblies A1, A2, which in turn are fitted around the middle part 1b of the rotating shaft 1. The bearing assemblies A1, A2 allow the rotating shaft 1 to rotate easily in relation to the stationary drum 4.

A motor stator 9 and a motor rotor 9' are attached, respectively, to the motor stator attachment portion of the stationary drum, and to an inner surface of the motor assembly casing 6. The motor stator 9 and the motor rotor 9' maintain a first predetermined separation from, and are in a facing relationship with, each other.

In addition, the head drum assembly is also provided with a stator transformer 8 installed in the stator transformer groove of the stationary drum 4, and a rotor transformer 7 attached to the protruding annular portion of the flange 3. The rotor transformer 7 and the stator transformer 8 maintain a second predetermined separation from, and are in a facing relationship with, each other. The rotor transformer 7 and the stator transformer 8 are capable of providing signals to, and receiving signals from, each other. The rotor transformer 7 is also electrically communicating with the magnetic heads 2a, while the stator transformer 8 receives signals from, and outputs signals to, other parts of the VCR through a flexible PCB 4B which is inserted through the PCB slot prepared on the circumferential surface of the stationary drum 4.

However, the head drum assembly cannot operate properly if the separation between the rotor and the stator transformers 7, 8 is too small, or too big. Thus, a proper operation of the head assembly requires that the rotor transformer 7 and the stator transformer 8 be separated by a correct distance from each other. In the conventional ball bearing type head assembly, the separation between the rotor and the stator transformers 7, 8 depends on the height of the protruding annular portion of the flange 3, and on the height of the protrusion 3P. Thus, to ensure that the rotor and the stator transformers 7, 8 are given the predetermined separation, the protruding annular portion and the protrusion 3P are carefully worked to ensure that they have a proper height.

Thus, the conventional head assembly described above suffers from the disadvantage that it is difficult to provide the predetermined separation between the rotor and the stator transformers 7, 8. In addition, the degree of precision required in preparing the protruding annular portion of the flange 3 and the protrusion 3P, and the fact that the rotary drum has to be attached to a separate flange that is fitted first around the rotating shaft 1 add extra steps to the manufacturing process of the head drum assembly, thus lowering a production efficiency and resulting in an increased unit cost.

SUMMARY OF THE INVENTION

It is, therefore, a primary object of the present invention to provide a head drum assembly with a modified structure which helps simplify the manufacturing process thereof.

It is another object of the present invention to provide a head drum assembly with a modified structure that facilitates the provision of a predetermined separation between a rotor transformer and a stator transformer installed therein.

In accordance with a preferred embodiment of the present invention, there is provided a head drum assembly comprising: a stationary shaft, divided into an upper portion, a middle portion, and a lower portion; a stationary drum fitted tightly around the lower portion of the stationary shaft; a rotary drum provided with a top surface whereon a rotor transformer attachment part is prepared, and fitted around a pair of upper and lower bearing assemblies arranged around the middle portion of the stationary shaft; a plurality of magnetic heads installed in the rotary drum; a rotor transformer affixed to the rotor transformer attachment part of the rotary drum; a ring collar fitted tightly around the upper portion of the stationary shaft; a conical washer spring fitted around the stationary shaft and interposed between the ring collar and the upper bearing assembly; a stator transformer plate fitted around, and attached to, the ring collar; a stator transformer, installed on a bottom surface of the stator transformer plate, maintaining a predetermined separation from, while in a facing relationship with, the rotor transformer.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
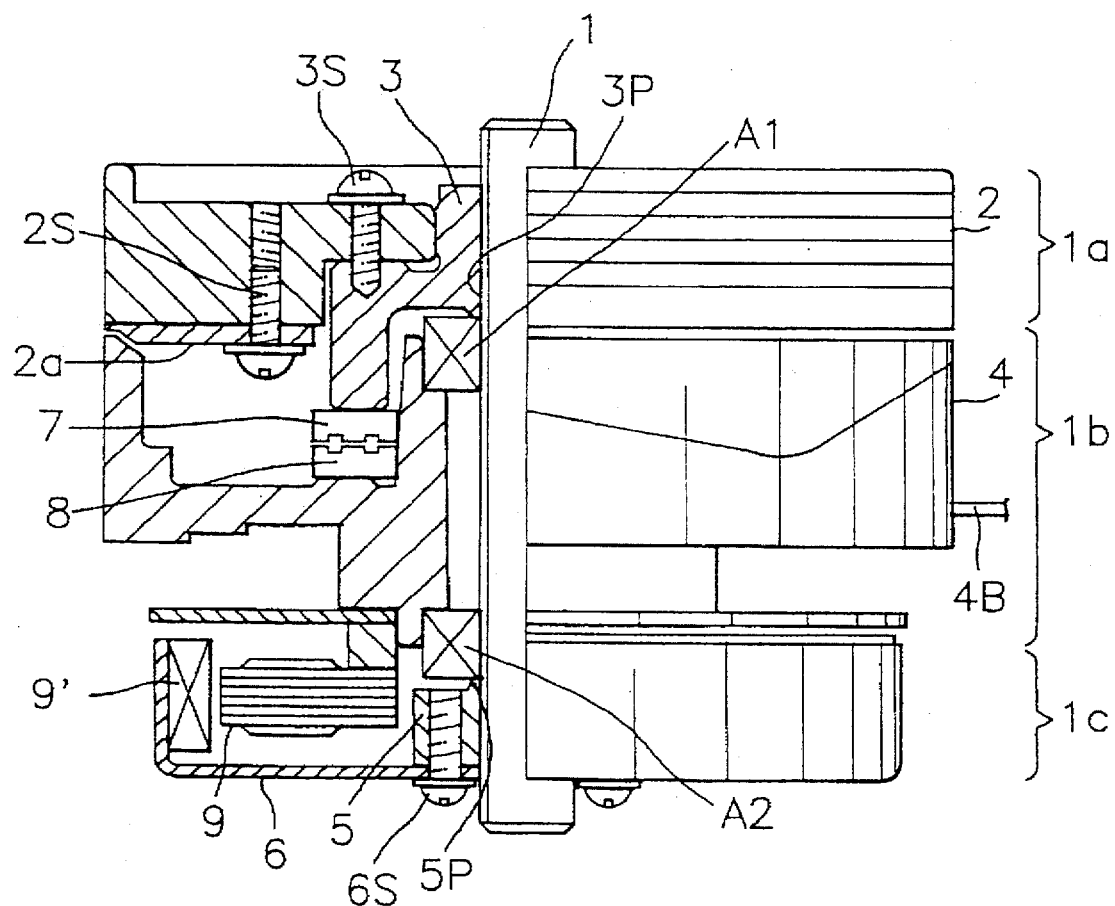
FIG. 1 presents a partial cut-away view of a conventional head drum assembly.
Figure 2:
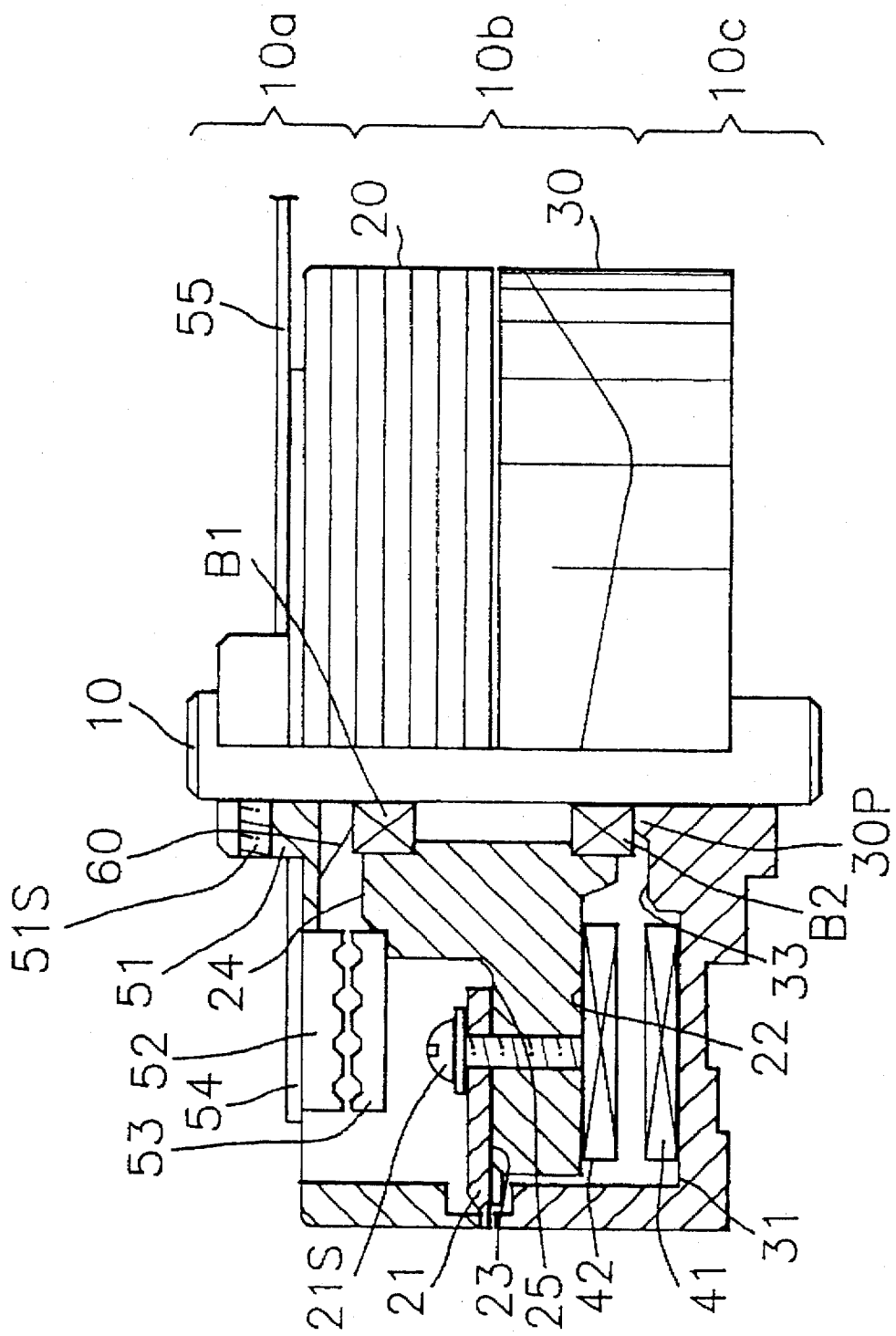
FIG. 2 shows a partial cut-away view illustrating a head drum assembly in accordance with a preferred embodiment of the present invention.

Referring to FIG. 2, there is shown a head drum assembly in accordance with a preferred embodiment of the present invention. The head drum assembly comprises a stationary shaft 10, a stationary drum 30, a rotary drum 20, a ring collar 51, an upper bearing assembly B1, and a lower bearing assembly B2.

The stationary shaft 10 can be divided into an upper portion 10a, a middle portion 10b, and a lower portion 10c. It should be noted that this division is arbitrarily undertaken for the purpose of facilitating the description of the head drum assembly presented below. The portions 10a, 10b, and 10c merely represent portions of the stationary shaft 10 that interact with different parts of the head drum assembly.

The stationary drum 30 is fitted tightly around the lower portion of the stationary shaft 10 and is provided with a top surface (not shown). The top surface of the stationary drum 30 is provided with a deep, annular groove 31 which accommodates a motor stator 41. A portion of the top surface surrounded by the annular groove forms an axial top surface 33. The axial top surface, in turn, is provided on its axial part with a protrusion 30P. The protrusion 30P comes in contact with the lower bearing assembly B2 and prevents it from moving downwardly in relation to the stationary shaft 10.

The rotary drum 20 is fitted around the upper and lower bearing assemblies B1, B2, which, in turn, fit around the middle portion 10b of the stationary shaft 10. The bearing assemblies B1, B2 allow the rotary drum 20 to rotate in relation to the stationary shaft 10. The rotary drum 20 is provided with a bottom surface 22 and a top surface (not shown). The top surface is furnished with a circular magnetic head groove 25. A portion of the top surface surrounded by the magnetic head groove 25 forms an axial top surface 24. In turn, a circumferential portion of the axial top surface 24 forms a rotor transformer attachment part (not shown).

The ring collar 51 is fitted around the upper portion 10a of the stationary shaft 10. The ring collar 51 is immobilized, i.e., prevented from moving in relation to the stationary shaft 10, by one or more locking screws 51S. A stator transformer attachment plate 54 is fitted around, and attached to, the ring collar 51. In addition, a conical washer spring 60 is fitted around the stationary shaft 10 and interposed between the ring collar 51 and the upper bearing assembly B1. The conical washer spring 60 exerts a uniform downward pressure on the upper bearing assembly B1, preventing it from shifting in relation to the stationary shaft 10 and the rotary drum 20.

The motor stator 41 and a motor rotor 42 are installed in the annular groove 31 and on the bottom surface 22 of the rotary drum 20, respectively. The motor stator 41 and the motor rotor 42 maintain a first predetermined separation from, and are in a facing relationship with, each other.

A stator transformer 52 and a rotor transformer 53 are installed on a bottom surface (not shown) of the stator transformer attachment plate 54, and on the rotor transformer attachment part of the rotary drum 20, respectively. As with the motor stator 41 and the motor rotor 42, the stator transformer 52 and the rotor transformer 53 maintain a second predetermined separation from, and are in a facing relationship with, each other.

In addition, the head drum assembly is also provided with a plurality, e.g., a pair, of magnetic heads 21, which are installed in the magnetic head groove 25 of the rotary drum 20. The magnetic heads 21 are bolted onto the rotary drum 20 by means of the same number of screws 21S, and can interact with a magnetic tape wrapped around the rotary and stationary drums 20, 30, through magnetic head windows (not shown) prepared on a circumferential surface (not shown) of the rotary drum 20. The magnetic heads 21 are connected electrically to the rotor transformer 53, while the stator transformer 52 is connected electrically to a flexible printed circuit board ("PCB") 55 which is attached to a top surface of the plate 54. The flexible PCB 55 allows for the stator transformer 52 to send signals to, and receive signals from, other parts (not shown) of the VCR.

In the head drum assembly in accordance with the preferred embodiment of the present invention described above, the stator transformer 52 and the rotor transformer 53 are given a correct separation by adjusting a vertical position of the ring collar 51, and immobilizing it by tightening the locking screw 51S once the correct separation has been obtained. This makes it easier to provide the correct separation between the stator and rotor transformers 52, 53, and results in a simpler manufacturing process, a lower defects rate, and, ultimately, a lower unit cost. In addition, the rotary drum 20 is fitted around the stationary shaft 10 in one piece, doing away with the need to provide a separate flange, thus further simplifying the manufacturing process and lowering the unit cost.

Figure 3:
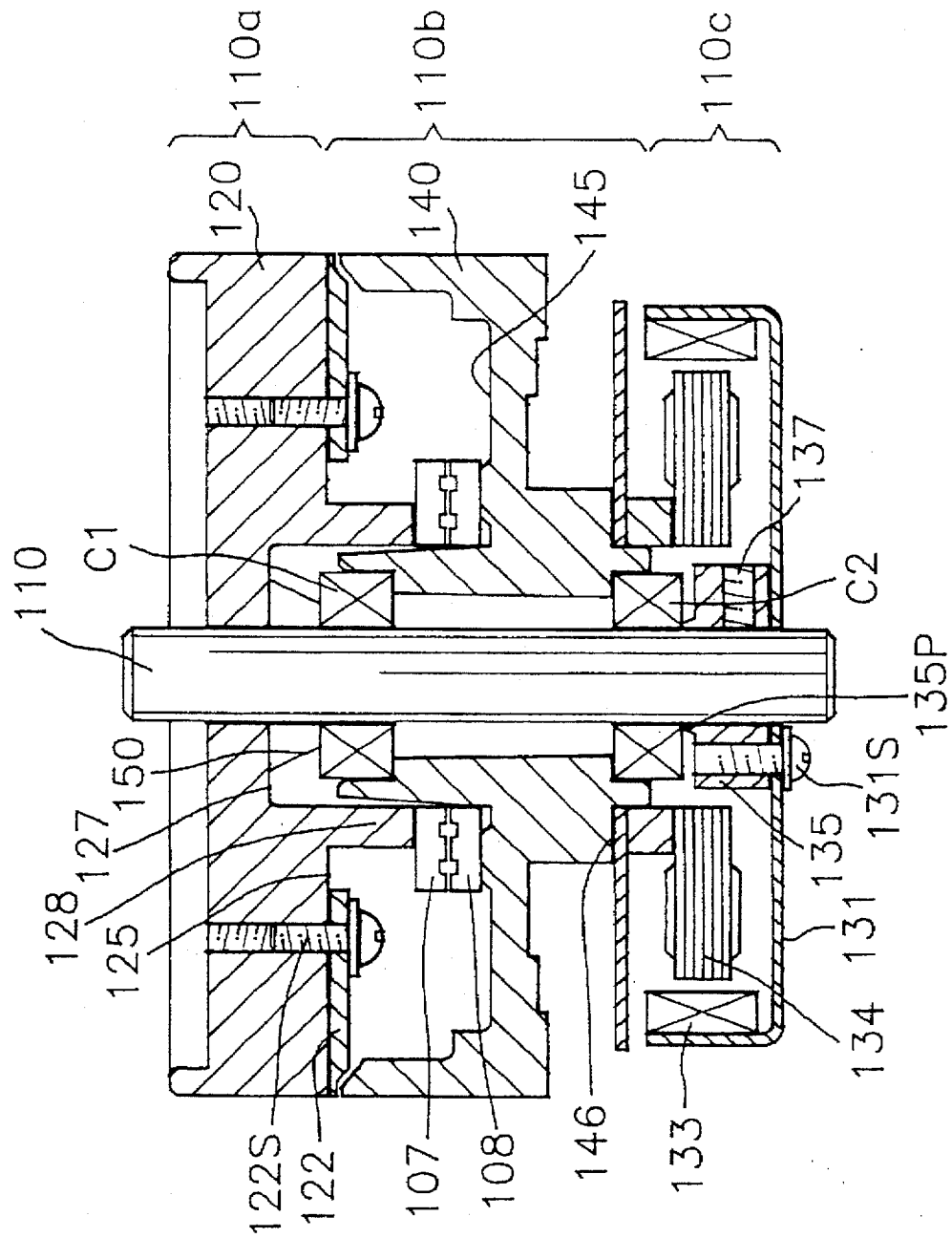
FIG. 3 offers a cross-sectional view depicting a head drum assembly in accordance with another embodiment of the present invention.

FIG. 3 presents a cross-sectional view depicting a head drum assembly in accordance with another embodiment of the present invention. The head drum assembly comprises a rotating shaft 110, divided into an upper portion 110a, a middle portion 110b, and a lower portion 110c, a rotary drum 120, a stationary drum 140, a conical washer spring 150, a ring collar 135, a rotor transformer 107, a stator transformer 108, a motor rotor 133, a motor stator 134, and a motor assembly casing 131.

The rotary drum 120 is tightly fitted around the upper portion 110a of the rotating shaft 110, and is provided with a protruding annular portion 128 on its bottom surface 125. The protruding annular portion 128, in turn, encloses an axial bottom surface 127. In addition, the rotary drum 120 is also provided with a plurality, e.g., a pair, of magnetic heads 122, each bolted onto the bottom surface 125 by means of a screw 122S.

The stationary drum 140 is fitted around an upper and a lower bearing assemblies C1, C2, which are arranged around the middle portion 110b of the rotating shaft 110. The stationary drum 140 is provided with a stator transformer groove 145 on its top surface (not shown), and with a motor stator attachment part 146 on its bottom surface (not shown). The bearing assemblies C1, C2 allow the rotating shaft 110 to rotate in relation to the stationary drum 140.

The conical washer spring 150 is fitted around the rotating shaft 110 and interposed between the axial bottom surface 127 of the rotary drum 120 and the upper bearing assembly C1. The conical washer spring 150 exerts a downward pressure on the upper bearing assembly C1, preventing it from moving upwardly in relation to the rotating shaft 110.

The ring collar 135 is fitted around the lower portion 110c of the rotating shaft 110, and is provided with an axial protrusion 135P on an axial part of its top surface (not shown). The ring collar 135 is immobilized, i.e., prevented from moving in relation to the rotating shaft 110, by one or more locking screws 137. The axial protrusion 135P contacts the lower bearing assembly C2 and prevents it from moving downwardly in relation to the rotating shaft 110. Thus, the axial protrusion 135P, in combination with the conical washer spring 150, prevents the bearing assemblies C1, C2, and the stationary drum 140 fitted around them from moving up or down in relation to the rotating shaft 110.

The motor assembly casing 131 is fitted around the rotating shaft 110 and bolted onto a bottom surface (not shown) of the ring collar 135 by means of a plurality of screws 131S.

The rotor transformer 107 and the stator transformer 108 are installed on the protruding annular portion 128 of the rotary drum 120, and in the stator transformer groove 145, respectively. The rotor transformer 107 and the stator transformer 108 maintain a first predetermined separation from, and are in a facing relationship with, each other. In addition, the rotor transformer 107 and the stator transformer 108 can communicate electrically with the magnetic heads 122, and a flexible PCB (not shown) inserted into the stationary drum 140, respectively.

The motor rotor 133 and the motor stator 134 are attached to the motor stator attachment part 146 of the stationary drum 140, and to an inner surface (not shown) of the motor assembly casing 131. Like the rotor and the stator transformers 107, 108, the motor rotor 133 and the motor stator 134 maintain a second predetermined separation from, and are in a facing relationship with, each other.

In the head drum assembly in accordance with the second preferred embodiment of the present invention described above, the rotor transformer 107 and the stator transformer 108 can be given the first predetermined separation by adjusting a distance between the rotary drum 120 and the stationary drum 140, and then fitting the ring collar 135 around the rotating shaft 110 and locking it into place by tightening the locking screw 137. In other words, the distance between the rotor transformer 107 and the stator transformer 108 can be narrowed by pushing the stationary drum 140 up the rotating shaft 110 towards the rotary drum 120. Then, once the rotor transformer 107 and the stator transformer 108 are separated by the first predetermined separation, the ring collar 135 is pushed up along the rotating shaft 110 until the axial protrusion 135P is flush against the lower bearing assembly C2. As stated above, the ring collar 135 can then be fixed into place by tightening the locking screw 137.

Thus, the head drum assembly in accordance with the second preferred embodiment of the present invention also allows the rotor and the stator transformers 107, 108 to be easily provided with a correct separation. As with the head assembly presented in FIG. 2, the head drum assembly in accordance with the second embodiment of the present invention also makes it possible to lower the unit cost by reducing the defects rate and removing the need to provide a separate flange.

While the present invention has been shown and described with reference to the particular embodiments, it will be apparent to those skilled in the art that many changes and modifications may be made without departing from the spirit and scope of the invention as defined in the appended claims.

What is claimed is:

1. A video cassette recorder incorporating therein a head drum assembly, said assembly comprising:

a stationary shaft;

a rotary drum fitted around the shaft through a set of upper and lower bearing assemblies;

a rotor transformer installed on the rotary drum;

a transformer separation adjusting means, fitted around the shaft and provided with a stator transformer which is in a facing relationship with the rotor transformer, capable of being moved up and down in relation to the shaft to thereby adjust a separation between the rotor transformer and the stator transformer;

a locking means for immobilizing the transformer separation adjusting means in relation to the shaft once the transformer separation means has been positioned around shaft so that the rotor and the stator transformers are provided with a predetermined separation; and a conical washer spring fitted around the shaft and interposed between the transformer separation means and the upper bearing assembly, the conical washer spring exerting a downward pressure on the upper bearing assembly, thereby preventing the upper bearing assembly from moving upwardly in relation to the shaft.

2. The recorder of claim 1, wherein the transformer separation adjusting means includes a ring collar that fits around an upper portion of the shaft and a stator transformer attachment plate to which the stator transformer attaches.

3. The recorder of claim 2, wherein the locking means includes a locking screw prepared in the ring collar, which when tightened prevents the ring collar from moving up or down in relation to the shaft.

4. A head drum assembly for use in a video cassette recorder, said assembly comprising:

a stationary shaft;

a rotary drum fitted around the shaft through a set of upper and lower bearing assemblies;

a rotor transformer disposed on the rotary drum;

a collar fitted around the shaft and provided with a stator transformer disposed thereon, said stator transformer is positioned opposite from said rotor transformer, said ring collar is capable of being moved up and down in relation to the shaft to provide a predetermined separation between said rotor transformer and said stator transformer;

a fastener adapted to immobilize the collar in relation to the shaft after said collar is positioned around the shaft so that the rotor and the stator transformers are provided with said predetermined separation; and a resilient member fitted around the shaft and interposed between said collar and the upper bearing assembly, said resilient member exerting a downward pressure on the upper bearing assembly, so as to inhibit the upper bearing assembly from moving upwardly in relation to the shaft.

5. The head drum assembly according to claim 4, wherein the resilient member includes a conical washer spring.

* * * * *